United States Patent [19]
Frisby

[11] Patent Number: 5,490,656
[45] Date of Patent: Feb. 13, 1996

[54] CAMPER JACK STAND SYSTEM

[76] Inventor: Robert M. Frisby, 1750 E. 4800 South #35, Holladay, Utah 84117

[21] Appl. No.: 375,585

[22] Filed: Jan. 19, 1995

[51] Int. Cl.$^6$ ........................................ A47F 5/00
[52] U.S. Cl. .................. 248/352; 248/357; 280/765.1
[58] Field of Search ...................... 248/352, 159, 248/351, 354.1, 357; 280/765.1, 763.1

[56] References Cited

U.S. PATENT DOCUMENTS

| | | | |
|---|---|---|---|
| 3,043,549 | 7/1962 | Wilkinson | 248/351 |
| 3,190,480 | 6/1965 | Maynez | 248/351 X |
| 3,198,486 | 8/1965 | Allen | 248/354.1 X |
| 3,317,173 | 5/1967 | Williams | 248/351 |
| 3,332,699 | 7/1967 | Devys | 280/763.1 X |
| 3,801,128 | 4/1974 | Herndon | 280/763.1 |
| 4,268,066 | 5/1981 | Davis | 248/352 X |
| 4,684,097 | 8/1987 | Cox | 248/357 X |
| 4,690,361 | 9/1987 | Lundman | 248/352 |
| 4,723,744 | 2/1988 | Baker | 248/352 X |
| 4,905,953 | 3/1990 | Wilson | 248/352 |
| 5,141,197 | 8/1992 | MacKaay | 280/765.1 X |
| 5,197,311 | 3/1993 | Clark | 248/352 X |

FOREIGN PATENT DOCUMENTS

| | | | |
|---|---|---|---|
| 2248431 | 4/1992 | United Kingdom | 248/352 |

Primary Examiner—J. Franklin Foss

[57] ABSTRACT

A camper jack stand system comprising: at least one stand, each stand being formed in an elongated configuration and including a top segment, a bottom segment and central segment therebetween, the top segment including coupling devices to permit releasable coupling of a conventional camper jack thereto, the bottom segment having a wide base to provide a stable support foundation for the stand, the elongated central segment providing additional clearance height between the ground and a camper supported by a conventional camper jack.

10 Claims, 3 Drawing Sheets

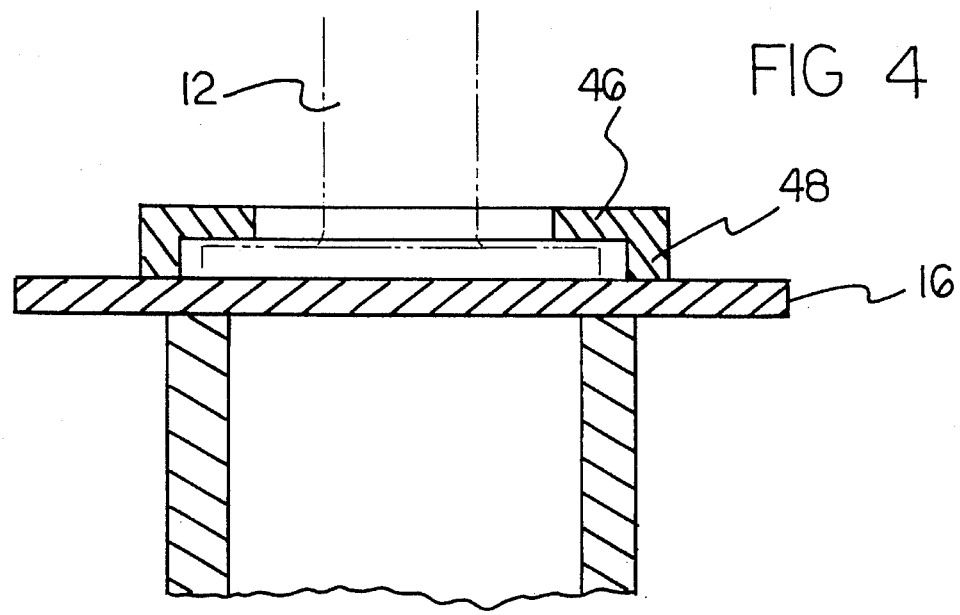
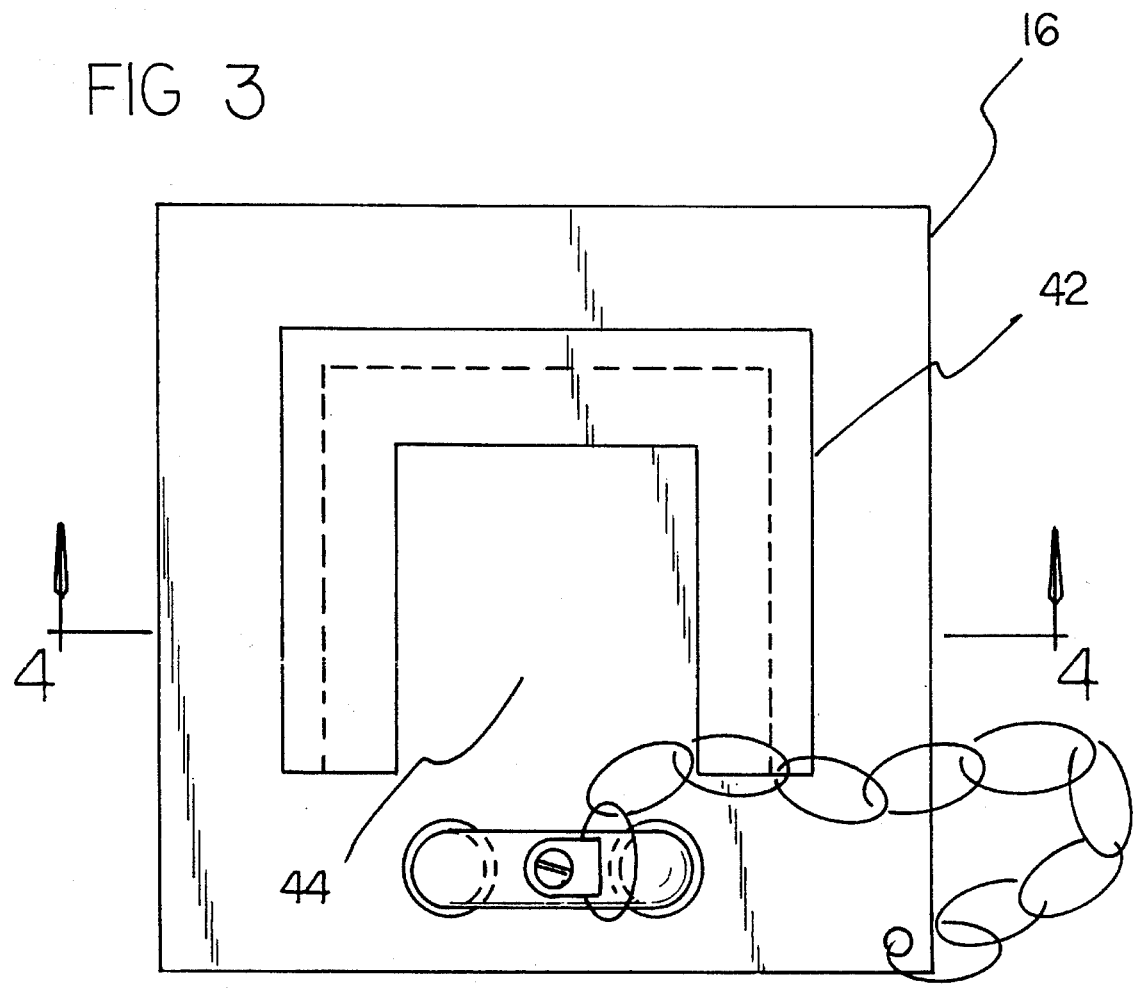

CAMPER JACK STAND SYSTEM

BACKGROUND OF THE INVENTION

1. Field of the Invention

The present invention relates to a camper jack stand system and more particularly pertains to positioning conventional jacks in the foot holders of the apparatus to provide additional clearance height.

2. Description of the Prior Art

The use of camper jacks is known in the prior art. More specifically, camper jacks heretofore devised and utilized for the purpose of lifting and supporting campers are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 4,723,744 to Baker, Jr. et al. discloses a camper storage stand.

U.S. Pat. No. 3,580,599 to Dodgen discloses a jack and tiedown system for a vehicle mounted camper.

U.S. Pat. No. 3,658,376 to Dodgen et al. discloses a jack and tiedown system for a vehicle mounted camper.

U.S. Pat. No. 3,698,758 to Dodgen discloses a jack and tiedown system for a vehicle device.

U.S. Pat. No. 4,044,999 to Dodgen discloses a camper jack.

Lastly, U.S. Pat. No. 5,237,256 to Chambers discloses a quick-to-ground camper jack.

In this respect, the camper jack stand system according to the present invention substantially departs from the conventional concepts and designs of the prior art, and in doing so provides an apparatus primarily developed for the purpose of positioning conventional jacks in the foot holders of the apparatus to provide additional clearance height.

Therefore, it can be appreciated that there exists a continuing need for a new and improved camper jack stand system which can be used for positioning conventional jacks in the foot holders of the apparatus to provide additional clearance height. In this regard, the present invention substantially fulfills this need.

SUMMARY OF THE INVENTION

In view of the foregoing disadvantages inherent in the known types of camper jacks now present in the prior art, the present invention provides an improved camper jack stand system. As such, the general purpose of the present invention, which will be described subsequently in greater detail, is to provide a new and improved camper jack stand system and method which has all the advantages of the prior art and none of the disadvantages.

To attain this, the present invention essentially comprises a new and improved camper jack stand system comprising, in combination: at least two camper jack fabricated of steel and formed in an elongated generally rectangular configuration with an upper end and a lower end, each upper end including coupling means to permit releasable coupling to the lower surface of a camper, each lower end including a planar generally rectangular shaped foot to stabilize the jack; at least two stands fabricated of steel and including a top segment, a bottom segment and a central segment therebetween, each stand providing additional clearance height between the ground and a camper supported by the camper jack, each stand including: a bottom segment formed in a planar generally rectangular configuration with an upper surface and a lower surface, the lower surface being positioned upon the ground or some other recipient surface in the operative orientation, the approximate center point of the upper surface including coupling means, the bottom segment providing a stable foundation for the stand; a central segment formed as an elongated generally rectangular shaped shaft, the central segment having an upper end and a lower end and positioned vertically in the operative orientation, the lower end being coupled to the coupling means on the upper surface of the bottom segment, at least one generally U-shaped handle being affixed to the central segment to permit easy transport by the user; and a top segment formed in a planar generally rectangular configuration with an upper surface and a lower surface, the top segment having a greater length and width than the central segment and being positioned centrally upon the central segment, the upper surface including a generally rectangular shaped foot holder, the foot holder having three closed sides and one open side, the foot holder having a horizontal upper surface and a vertical lower surface, the lower surface being affixed to the upper surface of the top segment, the upper surface of the foot holder being positioned above its lower surface forming a slot therebetween, the slot permitting the slidable positioning of the foot of the camper jack therein, the top segment including a pair of apertures extending therethrough adjacent to the open side of the foot holder, a U-bolt being fabricated of steel and formed in a generally U-shaped configuration, the U-bolt having two free ends and a curved region therebetween, the free ends of the U-bolt adapted to be positioned through the apertures with the curved region facing upward, a chain formed of a plurality of links coupling the U-bolt to the top segment, the U-bolt preventing inadvertent decoupling of a jack positioned therein.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved Camper jack stand system which has all of the advantages of the prior art camper jacks and none of the disadvantages.

It is another object of the present invention to provide a new and improved camper jack stand system which may be easily and efficiently manufactured and marketed.

It is further object of the present invention to provide a new and improved camper jack stand system which is of durable and reliable constructions.

An even further object of the present invention is to provide a new and improved camper jack stand system which is susceptible of a low cost of manufacture with regard to both materials and labor, and which accordingly is then susceptible of low prices of sale to the consuming public, thereby making such camper jack stand system economically available to the buying public.

Still yet another object of the present invention is to provide a new and improved camper jack stand system which provides in the apparatuses and methods of the prior art some of the advantages thereof, while simultaneously overcoming some of the disadvantages normally associated therewith.

Still another object of the present invention is to position conventional jacks in the foot holders of the apparatus to provide additional clearance height.

Lastly, it is an object of the present invention to provide a camper jack stand system comprising: at least one stand, each stand being formed in an elongated configuration and including a top segment, a bottom segment and central segment therebetween, the top segment including coupling devices to permit releasable coupling of a conventional camper jack thereto, the bottom segment having a wide base to provide a stable support foundation for the stand, the elongated central segment providing additional clearance height between the ground and a camper supported by a conventional camper jack.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a top plan view of the apparatus illustrating the upper segment and foot holder thereof.

FIG. 4 is a cross sectional view of the apparatus taken along line 4—4 of FIG. 3.

The same reference numerals refer to the same parts through the various Figures.

DESCRIPTION OF THE PREFERRED EMBODIMENT

Figure 1:
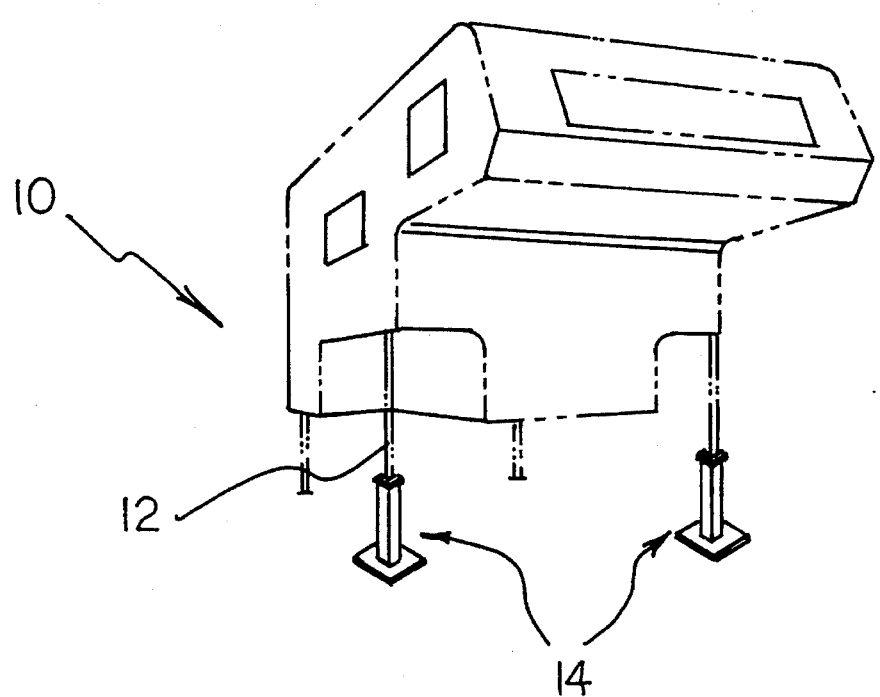
FIG. 1 is a perspective view of the preferred embodiment of the camper jack stand system constructed in accordance with the principles of the present invention.

With reference now to the drawings, and in particular to FIG. 1 thereof, the preferred embodiment of the new and improved camper jack stand system embodying the principles and concepts of the present invention and generally designated by the reference numeral 10 will be described.

The present invention, the camper jack stand system 10 is comprised of a plurality of components. Such components in their broadest context include at least two camper jacks 12, at least two stands 14, each stand including: a top segment 16, a central segment 18 and a bottom segment 20. Such components are individually configured and correlated with respect to each other so as to attain the desired objective.

More specifically, at least two camper jacks 12 are fabricated of steel and formed in an elongated generally rectangular configuration. Each camper jack 12 includes an upper end and a lower end. The upper end includes coupling means to permit releasable coupling to the lower surface of a camper. The camper jack is constructed in a retractable telescopic configuration to permit adjustment of its vertical height. The coupling means at the upper end of each jack securely couples to the underside of a camper in the operative orientation. The lower end includes a planar generally rectangular shaped foot to stabilize the jack. Note FIGS. 1 and 4.

Figure 2:
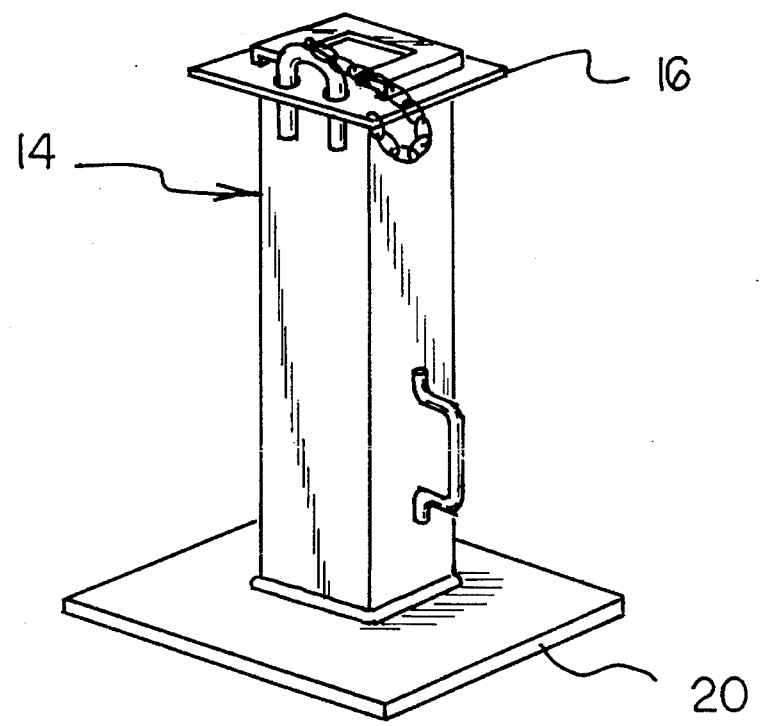
FIG. 2 is an isolated perspective illustration of the apparatus shown in FIG. 1.

At least two stands are each fabricated of steel. Each stand includes a top segment 16, a bottom segment 20 and a central segment 14 therebetween. The sturdy steel construction of the stands enables them to support the weight of a heavy camper without bending or breaking. The stands also obviate the need for the camper jacks to be fully telescopically extended. Camper jacks end to bend in their fully extended orientation, paricularly when wind is blowing. The stand provides additional clearance height between the ground and a camper supported by the camper jack 12. Note FIG. 2.

Figure 5:
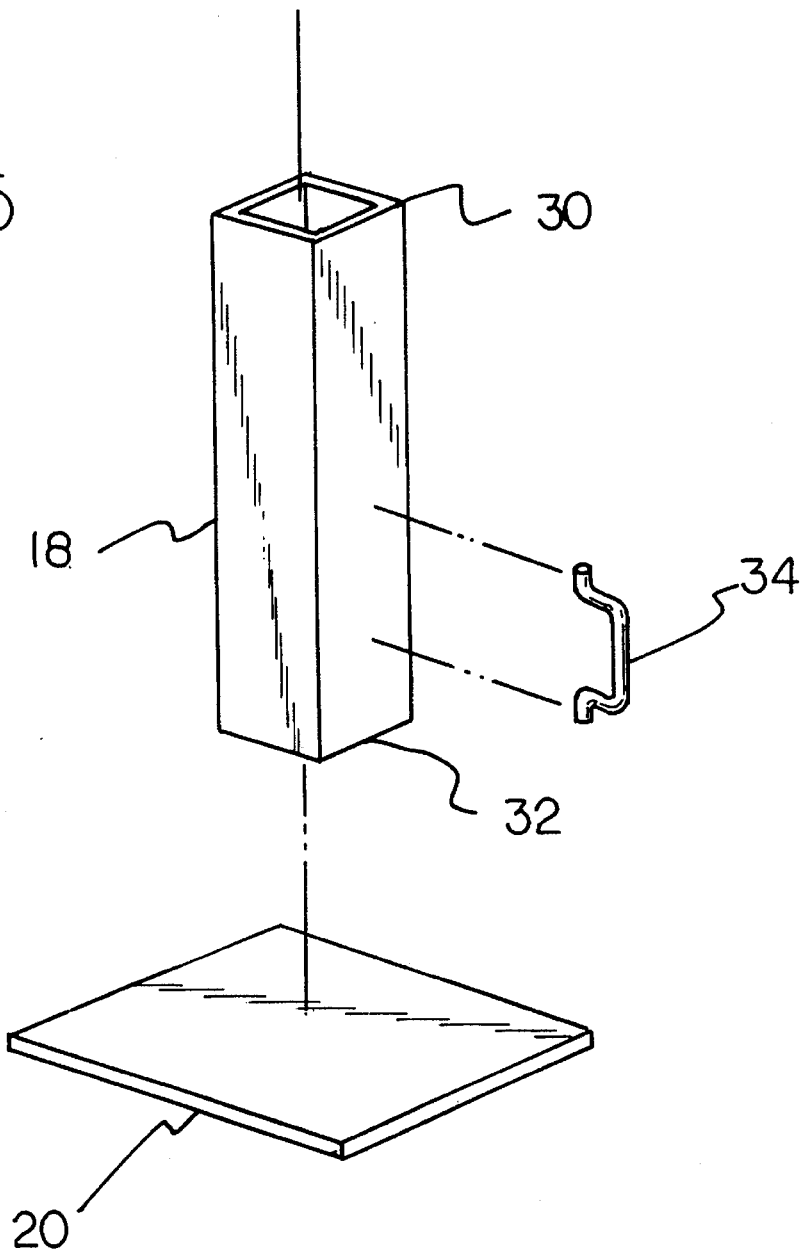
FIG. 5 is a separated perspective view of the apparatus illustrating the positioning of the various components thereof.

Each bottom segment 20 is formed in a planar generally rectangular configuration with an upper surface and a lower surface. In the preferred embodiment the bottom segments are 12 inches long and wide, and ¼ inch thick. In an alternative embodiment of the apparatus the bottom segment is formed in a planar generally circular configuration. The lower surface is positioned upon the ground or some other recipient surface in the operative orientation. The approximate center point of the upper surface includes coupling means. The bottom segment provides a stable foundation for the stand. The bottom segment is much larger than the foot of a conventional camper jack. The larger size has the effect of more evenly distributing weight over potentially uneven terrain. The larger size provides a significantly more stable foundation for support of the camper than the existing jack. Note FIG. 5.

The central segment 14 of each stand is formed as an elongated generally rectangular shaped shaft. In the preferred embodiment the central segments are each fabricated of 4 by 4 inch square pipe and are 18 inches tall. The central segments have an upper end 30 and a lower end 32 and are positioned vertically in the operative orientation. The lower end is coupled to the coupling means on the upper surface of the bottom segment. In an alternative embodiment of the apparatus the central segment is welded to the approximate center point of the base. At least one generally U-shaped handle 34 is affixed to the central segment to permit easy transport by the user. The handle is welded to the central segment between its approximate center point and lower end. The placement of the handle at this location enables the user to evenly distribute the weight of the apparatus when carrying and transporting it. Note FIGS. 2 and 5.

Each top segment is formed in a planar generally rectangular configuration with an upper surface 38 and a lower surface 40. In the preferred embodiment the top segments are fabricated of ¼ inch steel and are 6 inches long and wide. The top segment has a greater length and width than the central segment and is positioned centrally upon the central segment. The upper surface includes a generally rectangular shaped foot holder 42. The foot holder has three closed sides and one open side 44. The foot holder has a horizontal upper surface 46 and a vertical lower surface 48. Note FIG. 4. The lower surface is affixed to the upper surface of the top segment. In one embodiment of the apparatus the upper segment is welded to the upper end of the central segment. Note FIGS. 2 and 5.

The upper surface of each foot holder is positioned above its lower surface forming a slot therebetween. The slot permits the slidable positioning of the foot of the camper jack within it. The user simply takes the existing jack and slides the foot thereof into the slot. The user then adjusts the height of the jack in a telescopic fashion. The height of the stands obviate the need for the user to adjust the camper jacks to their full telescopic length in order to remove a truck coupled to a camper. The fully telescoped jack is less sturdy than jacks in the non telescoped orientation. Note FIGS. 3, 4 and 5.

Each top segment 16 includes a pair of apertures extending through it adjacent to the open side of the foot holder. A U-bolt 56 is fabricated of steel and formed in a generally U-shaped configuration. The U-bolt has two free ends 58 and a curved region 60 therebetween. The free ends of the U-bolt are adapted to be positioned through the apertures 52 with the curved region facing upward. A chain 62 is formed of a plurality of links which couple the U-bolt to the top segment. The U-bolt prevents inadvertent decoupling of a jack positioned within it. A stand positioned on uneven terrain could potentilly shift resulting in the camper jack sliding out of the foot holder. The U-bolt prevents this from happening. In an alternative embodiment of the apparatus a single rod with coupling means is affixed adjacent to the open end of the foot holder to prevent decoupling. Note FIGS. 3 and 5.

The camper jack stand system is designed for use in association with truck campers. The stands of the apparatus are positioned beneath a camper's jacks. The apparatus aids the use in a variety of ways: It provides additional height, compensating for tall trucks or uneven ground; It provides a more sturdy, secure support system; and at the campsite, it allows owners to easily remove trucks from beneath their campers, freeing the trucks for other uses.

The camper jack stand system is made of steel. The base is twelve inches square. The central segment of the stand is eighteen inches tall. The top segment of the apparatus has a foot holder that permits slidable receipt of the foot of a jack within it. To use the apparatus the user simply slips the camper jack stand system onto the jack foot, and lowers it to the ground. A U-bolt is inserted through the platform mouth to prevent the jack foot from accidently slipping out of the holder. The camper jack stand system includes handles to aid transport.

The camper jack stand system has been designed to improve the jack system of truck campers. The apparatus eliminates the need to use bricks, wood, or blocks beneath the camper jacks to provide leveling or height adjustment. These methods are insecure, hard to handle, and unsafe. The camper jack stand system makes the camper more stable when raising and lowering it in and out of storage. When utilizing the apparatus camper jacks no longer have to be extended to their full length. In the extended orientation they become unstable and are susceptible to bending. At the campsite, trucks can be easily removed from beneath campers and used for hunting, 4-wheeling, going into town, etc. The length of the apparatus compensates for extra-tall trucks and uneven ground. The handle provides an efficient means for carrying the apparatus.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved camper jack stand system comprising, in combination:

at least two camper jack fabricated of steel and formed in an elongated generally rectangular configuration with an upper end and a lower end, each upper end including coupling means to permit releasable coupling to the lower surface of a camper, each lower end including a planar generally rectangular shaped foot to stabilize the jack;

at least two stands fabricated of steel and including a top segment, a bottom segment and a central segment therebetween, each stand providing additional clearance height between the ground and a camper supported by the camper jack, each stand including:

a bottom segment formed in a planar generally rectangular configuration with an upper surface and a lower surface, the lower surface being positioned upon the ground or some other recipient surface in the operative orientation, the approximate center point of the upper surface including coupling means, the bottom segment providing a stable foundation for the stand;

a central segment formed as an elongated generally rectangular shaped shaft, the central segment having an upper end and a lower end and positioned vertically in the operative orientation, the lower end being coupled to the coupling means on the upper surface of the bottom segment, at least one generally U-shaped handle being affixed to the central segment to permit easy transport by the user; and a top segment formed in a planar generally rectangular configuration with an upper surface and a lower surface, the top segment having a greater length and width than the central segment and being positioned centrally upon the central segment, the upper surface including a generally rectangular shaped foot holder, the foot holder having three closed sides and one open side, the foot holder having a horizontal upper surface and a vertical lower surface, the lower surface being affixed to the upper surface of the top segment, the upper surface of the foot holder being positioned above its lower surface forming a slot therebetween, the slot permitting the slidable positioning of the foot of the camper jack therein, the top segment including a pair of apertures extending therethrough adjacent to the open side of the foot holder, a U-bolt being fabricated of steel and formed in a generally U-shaped configuration, the U-bolt having two free ends and a curved region therebetween, the free ends of the U-bolt adapted to be positioned through the apertures with the curved region facing upward, a chain formed of a plurality of links coupling the U-bolt to the top segment, the U-bolt preventing inadvertent decoupling of a jack positioned therein.

2. A camper jack stand system comprising:

at least one stand, each stand being formed in an elongated configuration and including a top segment, a bottom segment and central segment therebetween, the top segment including coupling devices to permit releasable coupling of a conventional camper jack thereto, the bottom segment having a wide base to provide a stable support foundation for the stand, the elongated central segment providing additional clearance height between the ground and a camper supported by a conventional camper jack.

3. The apparatus as set forth in claim 2 wherein each central segment is formed as a generally rectangular shaped shaft and each base being formed in a planar generally rectangular configuration.

4. The apparatus as set forth in claim 2 wherein each central segment is formed in a generally cylindrical configuration and each base being formed in a generally planar circular configuration.

5. The apparatus as set forth in claim 2 wherein each central segment includes at least one handle to permit easy transport by the user.

6. The apparatus as set forth in claim 2 wherein the length and width of each bottom segment is between about six and twenty four inches, the vertical height of each central segment being between about twelve and thirty six inches.

7. The apparatus as set forth in claim 2 wherein the components of each camper jack stand system are fabricated of metal.

8. The apparatus as set forth in claim 2 wherein the coupling device on each top segment is a foot holder, each foot holder having a slot positioned therein to permit slidable placement of the lower end of a conventional camper jack therein, each upper segment including a safety device to prevent the jack from decoupling with the foot holder.

9. The apparatus as set forth in claim 8 wherein each top segment includes two apertures and a safety device which is a U-bolt formed in a generally U-shaped configuration, the U-bolt having two free ends and a curved region therebetween, the free ends of the U-bolt adapted to be positioned through the apertures with the curved region facing upward, a chain formed of a plurality of links coupling the U-bolt to the top segment.

10. The apparatus as set forth in claim 8 wherein each safety device is a straight rod including coupling means and coupled adjacent to the foot holder to prevent inadvertent decoupling of a jack positioned therein.

* * * * *